UNITED STATES PATENT OFFICE.

LISE MEITNER, OF BERLIN, GERMANY, ASSIGNOR TO DR. O. KNÖFLER & CO., OF BERLIN-PLÖTZENSEE, GERMANY.

PREPARATION OF RADIOTHORIUM.

1,076,141.      Specification of Letters Patent.      Patented Oct. 21, 1913.

No Drawing.      Application filed February 18, 1913. Serial No. 749,229.

*To all whom it may concern:*

Be it known that I, LISE MEITNER, a subject of the Emperor of Austria-Hungary, and residing at Berlin, in the Empire of Germany, have invented certain new and useful Improvements in the Preparation of Radiothorium, of which the following is a specification.

The present invention relates to a process for the preparation of radiothorium, especially in the form of a precipitate that adheres firmly to its support.

The process consists essentially in precipitating radiothorium by electrolysis, at the cathode, from solutions which contain radiothorium and which may also contain mesothorium.

As an example, residues from the preparation of mesothorium, which contain both mesothorium and radiothorium and its disintegration series, are treated with a strong mineral acid until the mass is decomposed. The product of reaction is dissolved in water and the solution is separated from the insoluble residue by filtration. The solution is then electrolyzed at a medium voltage and a medium intensity of current, say of 3.05 volt and 2 amperes, the anode consisting of platinum, carbon or any other substance that is not easily attacked by chemical substances, while for the cathode platinum, silver or other metals and their alloys may be applied. It will be found that radiothorium separates at the cathode in a relatively pure state, so that it can be converted into other products. As a matter of course, solutions of radiothorium obtained by a different method from that above suggested may be electrolyzed in the same manner. Strongly active preparations of mesothorium that contain few other electrolyzable impurities can also be electrolyzed in the same manner, after the preparations have been first dissolved. The radiothorium present is precipitated in a highly concentrated form on a suitable support, whereby it is possible to obtain radiothorium on metal foils or metal wires pure to a degree not obtainable by any other method at present known.

Having now described my invention, what I claim as new and desire to secure by Letters Patent is:—

The herein described process of preparing durable radiothorium, consisting in electrolyzing solutions containing radiothorium in large excess and no or very little thorium, and precipitating the radiothorium at the cathode.

In testimony whereof I affix my signature in presence of two witnesses.

LISE MEITNER.

Witnesses:
    HENRY HASPER,
    WOLDEMAR HAUPT.

Copies of this patent may be obtained for five cents each, by addressing the "Commissioner of Patents, Washington, D. C."